(12) United States Patent
Fiebig et al.

(10) Patent No.: US 9,195,446 B2
(45) Date of Patent: Nov. 24, 2015

(54) METHOD AND REGISTRY FOR ENABLING THE ENFORCEMENT OF DESIGN-TIME POLICIES DURING RUNTIME IN A SERVICE-ORIENTED ARCHITECTURE

(75) Inventors: Thorsten Fiebig, Mannheim (DE); Gary Woods, Seeheim (DE); Daniel Adelhart, Bockhorn (DE)

(73) Assignee: SOFTWARE AG, Darmstadt (DE)

(*) Notice: Subject to any disclaimer, the term of this patent is extended or adjusted under 35 U.S.C. 154(b) by 450 days.

(21) Appl. No.: 13/457,819

(22) Filed: Apr. 27, 2012

(65) Prior Publication Data

US 2013/0262646 A1 Oct. 3, 2013

(30) Foreign Application Priority Data

Mar. 27, 2012 (EP) .................................... 12161454

(51) Int. Cl.
*G06F 15/173* (2006.01)
*G06F 12/00* (2006.01)
*G06F 9/44* (2006.01)
*G06F 9/445* (2006.01)
(Continued)

(52) U.S. Cl.
CPC .. *G06F 8/60* (2013.01); *G06F 8/20* (2013.01); *H04L 41/0893* (2013.01); *G06F 11/368* (2013.01); *H04L 67/34* (2013.01)

(58) Field of Classification Search
CPC ......... G06F 8/20; G06F 8/60; H04L 41/0893; H04L 67/34
USPC ................ 704/2; 717/101; 709/223; 707/822
See application file for complete search history.

(56) References Cited

U.S. PATENT DOCUMENTS 6,763,353 B2 * 7/2004 Li et al. ......................... 719/320
7,757,204 B2 * 7/2010 Fildebrandt et al. .......... 717/104
(Continued)

FOREIGN PATENT DOCUMENTS

WO  WO 2006026659 A2 * 3/2006

OTHER PUBLICATIONS

"Why Runtime Governance is Critical for Service-Based Applications," Progress Software, XP-002682007, Feb. 2009.
(Continued)

*Primary Examiner* — Viet Vu
*Assistant Examiner* — Michael A Chambers
(74) *Attorney, Agent, or Firm* — Nixon & Vanderhye PC

(57) ABSTRACT

Certain example embodiments relate to computer-implemented methods enabling the enforcement of design-time policies during runtime in a service-oriented architecture (SOA). The SOA includes SOA assets (e.g., web services), and at least one runtime container configured to enforce runtime policies on SOA assets executed therein. Example methods may include:
  obtaining at least one design-time policy from a SOA registry, the at least one design-time policy applying to SOA assets grouped into a design-time domain;
  automatically deriving at least one runtime policy from the at least one design-time policy and at least one runtime domain from the design-time domain, the runtime domain indicating at least one runtime container;
  performing a compatibility check to determine whether the at least one runtime policy is enforceable by the at least one runtime container; and
  depending on the compatibility check, automatically deploying the at least one runtime policy to the runtime container.

21 Claims, 4 Drawing Sheets

Figure 1:
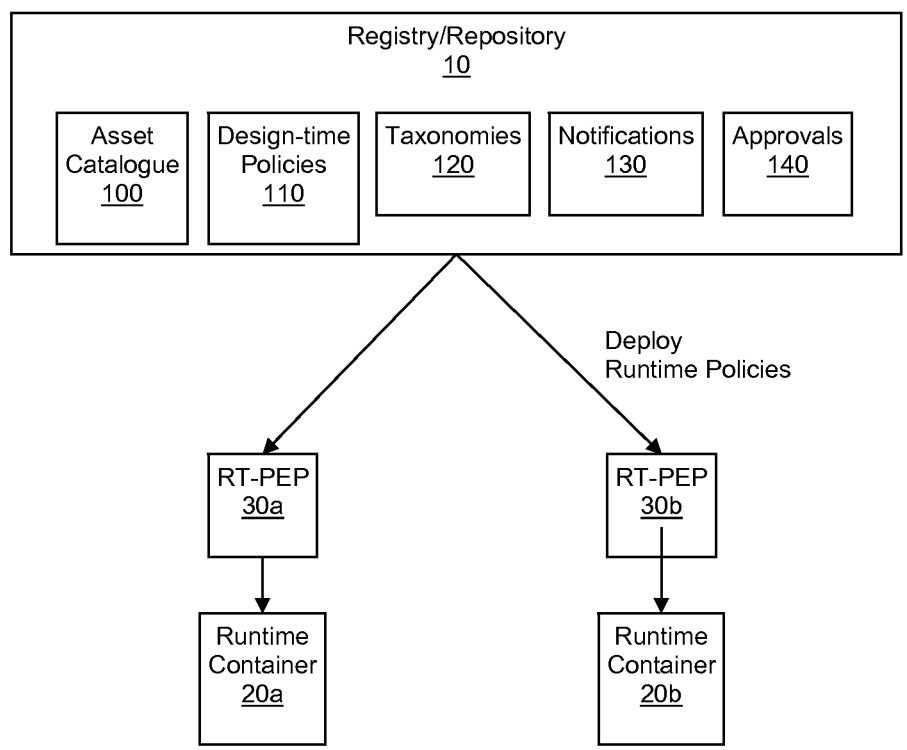

(51) Int. Cl.
*H04L 12/24* (2006.01)
*H04L 29/08* (2006.01)
*G06F 11/36* (2006.01)

(56) References Cited

U.S. PATENT DOCUMENTS

| | | | |
|---|---|---|---|
| 7,774,745 B2* | 8/2010 | Fildebrandt et al. | 717/105 |
| 8,266,184 B2* | 9/2012 | Liu et al. | 707/802 |
| 2003/0055624 A1* | 3/2003 | Fletcher et al. | 704/2 |
| 2007/0069896 A1* | 3/2007 | Boland et al. | 340/572.1 |
| 2007/0157159 A1* | 7/2007 | Fildebrandt et al. | 717/104 |
| 2007/0168384 A1* | 7/2007 | Fildebrandt et al. | 707/103 R |
| 2009/0138795 A1* | 5/2009 | Liu et al. | 715/234 |
| 2009/0138940 A1* | 5/2009 | Liu et al. | 726/1 |
| 2009/0281996 A1* | 11/2009 | Liu et al. | 707/3 |
| 2010/0095266 A1* | 4/2010 | Novak | 717/101 |
| 2010/0125618 A1* | 5/2010 | Dutta et al. | 707/822 |
| 2010/0161629 A1 | 6/2010 | Palanisamy et al. | |
| 2011/0029479 A1 | 2/2011 | Novak et al. | |

OTHER PUBLICATIONS

Aaron Skonnard, "Understanding WS-Policy," XP-002355708, Aug. 2003.

* cited by examiner

METHOD AND REGISTRY FOR ENABLING THE ENFORCEMENT OF DESIGN-TIME POLICIES DURING RUNTIME IN A SERVICE-ORIENTED ARCHITECTURE

This application claims priority to EP Patent Application No. 12 161 454.9 filed 27 Mar. 2012, the entire contents which is hereby incorporated by reference.

1. TECHNICAL FIELD

Certain example embodiments relate to a method and a registry for enabling the enforcement of design-time policies during runtime in a service-oriented architecture.

2. BACKGROUND AND SUMMARY

Modern computing systems nowadays involve a plurality of physically distinct computer connected over networks such as the Internet. In such distributed environments, the concept of service-oriented architectures (SOA) has become increasingly popular. In a SOA, the individual computers offer their functionality in the form of services, which are well-defined pieces of functionality defined by an interface. One service provides functionality to the other services, so that the overall computing task is performed in that the services interact with each other, each fulfilling a piece of the overall task.

As a result, a SOA provides a more flexible architecture by splitting monolithic applications into components that can be reused and orchestrated to get new functionality on demand. New or changed processes (which include technical processes, such as the control of an assembly line, and also business processes) can be implemented by combining existing services and/or other types of SOA assets.

Since the implementation of a SOA leads to a collection of distributed and loosely coupled services, maintaining interoperability and reusability in such an environment is a particularly difficult task, which is commonly referred to as "SOA governance". Besides the technical aspects of interoperability and reusability, SOA governance also has to address other aspects, such as the enforcement of security or legal regulations on SOA components.

SOA governance can be split into design-time and runtime governance. The design-time governance concerns the management of the participating SOA assets in a SOA registry/repository, the enforcement of design-time policies, lifecycle management and the versioning of SOA assets. The runtime governance concerns aspects such as monitoring the runtime interaction between the SOA assets and enforcing runtime polices. The runtime policies are typically deployed into so-called runtime containers of SOA assets and enforce the proper interactions between the SOA assets, which may include the rejection of unauthenticated accesses and/or checking the standard compliance of SOA asset invocations.

In the prior art, a variety of SOA registries/repositories are known (e.g. CentraSite of applicant, Systinet, WSRR, SOA Software, Oracle Enterprise Repository), which offer design-time governance features, such as the registration of SOA assets, lifecycle management (cf. e.g. US 2010/0095266 A1), and the enforcement of design-time policies. Some of the existing products also offer the capability of defining the runtime policies and deploying them to runtime containers (also called policy enforcement points). Moreover they are able interoperate with runtime governance products that monitor runtime interactions and report metrics data and runtime events. Certain runtime products are addressing the rogue services detection by monitoring service runtime interactions (e.g. Progress). Advanced rogue service detection goes beyond the runtime monitoring by applying so-called service harvesting, which can be performed by checking runtime containers to find out which services are deployed (cf. e.g. US 2010/0161629 A1). In summary, all of the existing products are either focused on the above-explained design-time governance or the runtime governance.

However, there is always the risk of a control gap between design-time and runtime governance. This gap can e.g. be caused by services which are not registered in the SOA registry/repository (so-called "rogue services"), thereby completely bypassing any design-time governance. It can also be caused by registered services violating the design-time governance during runtime, e.g. when a service is calling other services which it is not allowed to call, or when a service can already be deployed to the production runtime container albeit the service's lifecycle state in the SOA registry/repository defines that it is still under development. All these problems are caused by the fact that the runtime governance is not in line with the design-time governance.

It is therefore the technical problem underlying the present invention to provide a way of ensuring that all design-time policies for a given SOA are effectively and reliably enforced during runtime, thereby at least in part overcoming the above explained disadvantages of the prior art.

This problem is according to one aspect of the invention solved by a computer-implemented method for enabling the enforcement of design-time policies during runtime in a service-oriented architecture (SOA). The SOA comprises a plurality of SOA assets, such as web services, and at least one runtime container, the runtime container being adapted for enforcing runtime policies on SOA assets executed therein. In the embodiment of claim 1, the method comprises the following steps:

a. obtaining at least one design-time policy from a SOA registry of the SOA, wherein the at least one design-time policy applies to a plurality of SOA assets grouped into a design-time domain;

b. automatically deriving at least one runtime policy from the at least one design-time policy and at least one runtime domain from the design-time domain, the runtime domain indicating at least one runtime container;

c. performing a compatibility check to determine whether the at least one runtime policy can be enforced by the at least one runtime container; and d. depending on the result of the compatibility check, automatically deploying the at least one runtime policy to the runtime container.

This embodiment proposes an approach for closing the above-explained control gap by reliably combining design-time and runtime SOA governance, wherein it is ensured that the runtime governance comprehensively covers the design-time policies. This way, it is ensured that no services or other types of SOA assets violate the design-time governance during runtime, which includes both unregistered "rogue" services and registered services not following the design-time governance during runtime.

The above objectives are achieved in that the embodiment is based on the definition of domains, i.e. groupings of SOA assets, so that the approach allows to automatically derive runtime policies from a set of given design-time policies that are enforcing the domain structure. In particular, domains are advantageous for enforcing the domain structure also on rogue services. Since rogue services are not registered in the SOA registry/repository (see above), design-time policies cannot be directly attached to them. Therefore, in accordance with the invention the design-time domains are translated into runtime domains, which in turn represent a collection of runtime containers. Enforcing policies on these runtime domains ensures that rogue services are addressed properly. A given SOA may be structured into domains according to various aspects, such as the technical runtime environment suitable for a group of assets, or the like. The concept of domains simplifies the definition of policies governing the interaction between services and enables an automatic and, most importantly, comprehensive definition and deployment of runtime policies from a set of given design-time policies. In addition, since a compatibility check is performed before the SOA assets are deployed to runtime containers, it is ensured that SOA assets execute only in such runtime containers which can actually enforce the defined policies. This way, it is ensured that the design-time governance is effectively and comprehensively enforced during runtime. It is noted that the above-mentioned US 2010/0161629 A1 also concerns a governance framework based on domains, however, the framework does not address the definition of domain policies and their automatic and comprehensive deployment to runtime containers. In fact, none of the above-discussed approaches of the prior art provides a method for automatically enforcing design-time policies during runtime in a safe manner.

In one aspect of the present invention, the at least one design-time policy defines at least one restriction to be met by the SOA assets within the respective design-time domain. Accordingly, such domain-internal policies specify certain restrictions and/or regulations that do not consider the interaction with other domains. Examples are a policy which checks the proper authentication for Web service calls, or a policy which verifies that manufacturing services are supposed to only call services that are following certain manufacturing-relevant regulations.

Additionally or alternatively, the at least one design-time policy may define at least one restriction to be met by an interaction between two SOA assets from different design-time domains. By addressing the interactions between domains, such extra-domain policies enforce the domain structure and/or certain interaction rules. An example for such a domain policy is the restriction that services of the development domain are not supposed to be called by services of any other domain, which ensures that sensible development data are not spread across the organization. In other words, the policy effectively introduces a firewall around the services of the development domain, which may be managed e.g. by a special approval service, such as offered by the CentraSite SOA registry/repository of applicant. A further example is to restrict the set of services that can be called by the services of the development domain.

This ensures that the development services are only dependent on reliable services, in that it provides a set of domains that are allowed to be called by services of the development domain.

Preferably, the design-time policies and/or the runtime policies comprise one or more WS-Policy assertions adhering to the WS-Policy specification.

In another aspect of the present invention, performing the compatibility check may comprise obtaining at least one capability definition of the runtime container from the SOA registry and comparing the at least one capability definition of the runtime container with a required capability of the runtime-policy. Accordingly, each policy may define one or more capabilities needed in order to be enforced, and it is ensured that the policy is only deployed to a runtime container which has the desired capability, i.e. which is able to enforce the policy.

In yet another aspect, the at least one design-time policy may be defined in the SOA registry independent of a specific runtime container and the compatibility check may be performed based on a mapping obtained from the SOA registry, wherein the mapping maps the design-time domain onto at least one runtime domain, the runtime domain comprising the runtime container. This way, an automatic yet comprehensive and safe deployment is made possible.

Furthermore, the present method may comprise the further step of issuing a notification, if the at least one runtime policy cannot be enforced by the runtime container. Accordingly, the automated deployment process ensures that gaps in the automated deployment process are properly detected and can then be eliminated.

According to a further aspect of the invention, the design-time domain and/or the runtime domain may be defined in at least one taxonomy of the SOA registry. Taxonomies allow for a particular flexible definition of an arbitrary complex domain structure, as will be further explained in the detailed description below.

The present invention also provides a SOA registry for enabling the enforcement of design-time policies during runtime in a service-oriented architecture, wherein the SOA comprises a plurality of SOA assets, such as web services, and at least one runtime container, the runtime container being adapted for enforcing runtime policies on SOA assets executed therein, wherein the SOA registry comprises a policy storage, adapted for storing at least one design-time policy, wherein the at least one design-time policy applies to a plurality of SOA assets grouped into a design-time domain, means for automatically deriving at least one runtime policy from the at least one design-time policy and at least one runtime domain from the design-time domain, the runtime domain indicating at least one runtime container, means for performing a compatibility check to determine whether the at least one runtime policy can be enforced by the at least one runtime container, and means for, depending on the result of the compatibility check, automatically deploying the at least one runtime policy to the runtime container. Further advantageous modifications of embodiments of the SOA registry of the invention are defined in further dependent claims, wherein the SOA registry may be adapted for performing any of the above-described methods.

Also a service-oriented architecture (SOA) system is provided, the system comprising an SOA registry as described above and at least one runtime container. Lastly, the present invention relates to a computer program comprising instructions for implementing any of the above-described methods.

3. SHORT DESCRIPTION OF THE DRAWINGS

Figure 2:
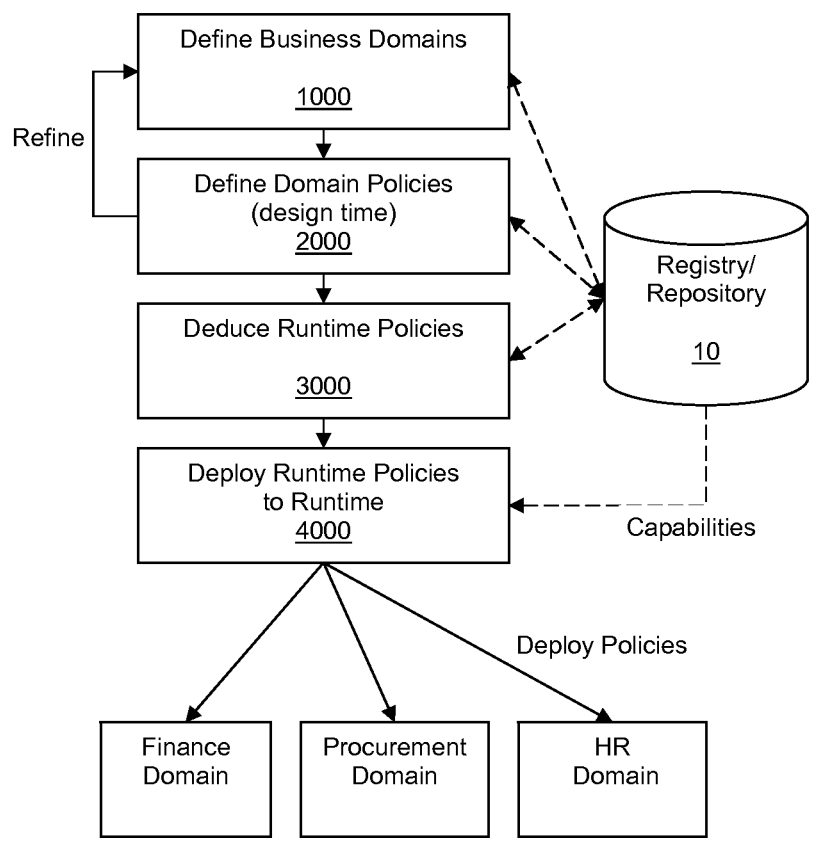
Figure 3:
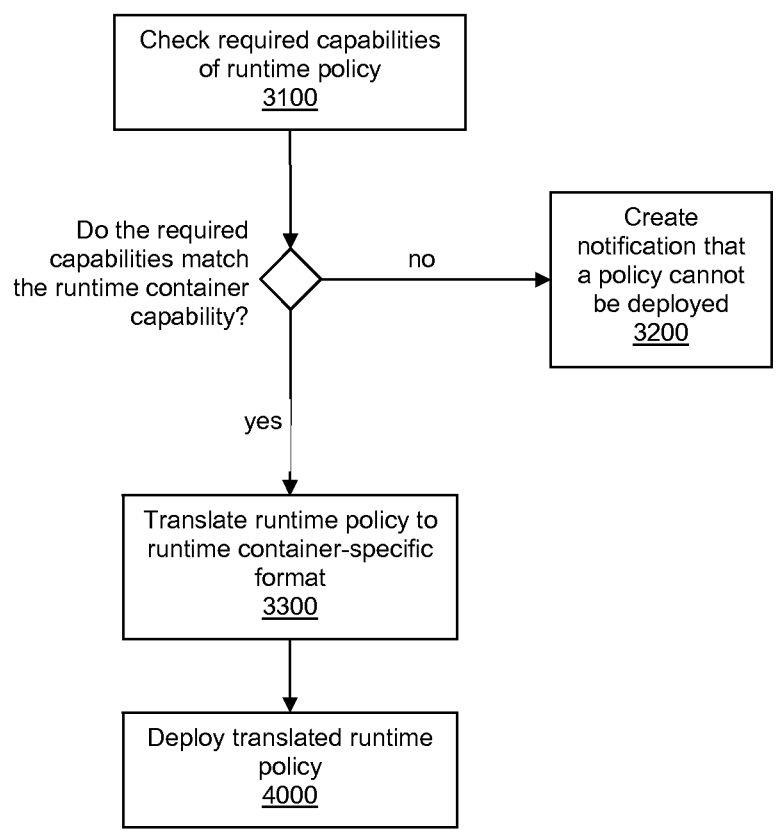

In the following detailed description, presently preferred embodiments of the invention are further described with reference to the following figures:

FIG. 1: A block diagram showing a SOA registry/repository in accordance with an embodiment of the present invention;

FIG. 2: A flowchart showing a method for the automated deployment of design-time policies in accordance with an embodiment of the present invention;

FIG. 3: A flowchart showing a method for performing a compatibility check in accordance with an embodiment of the present invention; and FIG. 4: A schematic diagram showing exemplary domain taxonomies in accordance with an embodiment of the present invention.

4. DETAILED DESCRIPTION

In general terms, example embodiments provide an approach for closing the control gap normally present between design-time and runtime SOA governance. Based on the definition of domains, the approach allows to automatically define a comprehensive set of runtime policies from a set of given design-time policies that are enforcing the domain structure. Mapping the domains to runtime domains enables the automatic deployment of domain policies.

Domains

The concept of domains supports the SOA governance by structuring a given set of SOA assets, such as web services. For example, a domain may be formed by grouping at least part of the SOA assets according to certain aspects of the enterprise architecture. Technical domains can be defined for a group of SOA assets that are related to a certain technical task of the overall system, e.g. certain web services controlling manufacturing machinery in an automobile assembly line may be grouped along their individual tasks (e.g. into an engine manufacturing domain, a chassis manufacturing domains and a "marriage" domain, in which the engine is combined with the chassis). Likewise, business domains may be defined by basing the grouping on the SOA assets according to organizational and/or functional aspects of the enterprise. The above domains are called design-time domains, since they relate to the physical and/or functional structuring of the interworking components, which is performed during design-time.

Runtime domains are defined by grouping the SOA runtime containers. Examples of SOA runtime containers are application servers or any other runtime components that allow the execution of SOA artifacts/assets. Exemplary products are webMethods Integration Server, Apache Tomcat, Apache Jetty, Oracle GlassFish, Oracle WebLogic and IBM WebSphere. Just like other SOA assets, also SOA domains (i.e. design-time and/or runtime domains) are registered in a SOA registry/repository. Further, the domains of the present invention may be divided into sub-domains, which can result in arbitrarily complex hierarchical structures. Therefore, the domains are preferably represented by taxonomies and their categories in the SOA registry/repository.

Figure 4:
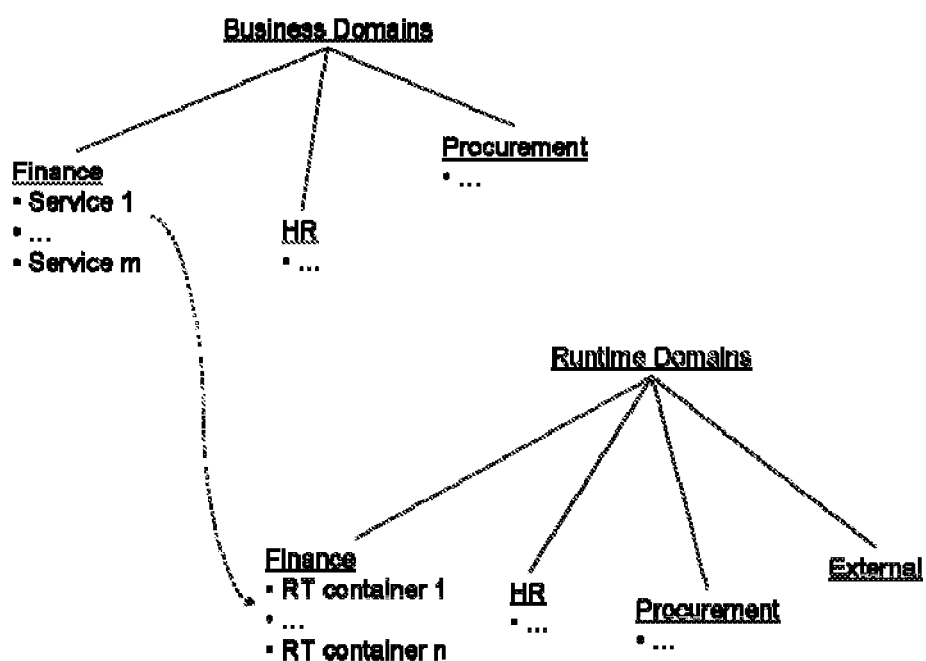

FIG. 4 shows an exemplary definition of business and runtime domains. As can be seen, the business (design-time) domains and the runtime domains are represented by two respective taxonomies (see the root nodes "Business Domains" and "Runtime Domains", respectively). The taxonomy "Business Domains" comprises a domain "Finance" with associated web services Service 1, . . . , Service m, as well as two further domains "HR" (human resources) and "Procurement". In this example, the business domains hold the metadata of their business services. The taxonomy "Runtime Domains" defines corresponding runtime domains "Finance", "HR" and "Procurement" and holds the metadata of the runtime containers belonging to the domain. The metadata registered for a runtime container in the SOA registry/repository provides the necessary information for deploying runtime policies (see further below). Beside the runtime domains holding runtime containers, FIG. 4 shows a further domain "External", which represents all external runtime containers, i.e. runtime containers external to the current SOA system. All 3rd party services not belonging to the current SOA system preferably belong to the external domain. For example if the SOA of a certain enterprise uses 3rd party services like Amazon Web Services, these services belong to the external domain. In another exemplary scenario the enterprise SOA runs in a private cloud. Thus, all services not running within the enterprise cloud belong to the external domain. This kind of representation is helpful for specifying domain policies addressing interactions with SOA assets running on external runtime containers. In the example of FIG. 4, all business services of the "Finance" domain are supposed to run in the runtime containers of the "Finance" runtime domain. Therefore, the "Finance" business domain is mapped to the "Finance" runtime domain (see the dotted arrow in FIG. 4).

Domain-Based Policies

Policies are attached to domains for enforcing the domain structure and for ensuring that the SOA assets of a domain are compliant to certain predefined rules. Therefore, the scope of a domain policy is the set of assets within in the domain, i.e. all SOA assets of a given domain have to fulfill the policies defined for that domain.

Domain-internal policies specify certain restrictions or regulations that do not consider the interaction with other domains. A simple example is a policy that checks the proper authentication for Web service calls. A more advanced example for domain internal policy is a policy verifies that finance services are supposed to only call services that are following certain tax relevant regulations.

The domain policies addressing the interactions between domains enforce the domain structure and certain interaction rules. An example for such a domain policy is the restriction that services of the Finance business domain are not supposed to be called by services of any other domain. This restriction is supposed to ensure that sensible finance data are not spread across the organization. The policy effectively introduces a firewall around the services of the Finance business domain.

Policies may be implemented via executable script languages or JAVA programs, however, there are also several XML-based standards such as WS-Policy, XACML and WS-Trust for specifying policies in a declarative way. The declarative specification facilitates an automatic translation. In embodiments of the present invention, a rule-based approach is proposed which is, however, not restricted to declarative specifications. The approach proposed is also applicable to any other format suitable for automatic translation.

The following sample shows a policy which implements the above-mentioned firewall for the "Finance" domain.

```
Policy "FinanceFirewall" {
   Rule {
      When { getTargetDomain( ) == "Finance" }
      Satisfy { getOriginDomain( ) == "Finance" }
   }
}
```

The above-mentioned exemplary policy "FinanceFirewall" is shown in pseudo code. It comprises a rule which checks whether the incoming request is directed to the "Finance" domain. If this is the case, the request must also be originating from the "Finance" domain. For specifying the policies enforcing the domain structure, a set of functions may be provided for retrieving domain-related information from a request, such as the functions given in the above example policy. An exemplary translation of the "FinanceFirewall" policy into XML based syntax may look as follows:

```
<csp:Policy name="FinanceFirewall">
   <csp:Rule>
      <csp:When>
```

```
            <csp:Function name="Equals">
                <csp:Parameter>
                    <csp:Function name="GetTargetDomain"/>
                </csp:Parameter>
                <csp:Parameter>"Finance"</csp:Parameter>
            </csp:Function>
        </csp:When>
        <csp:Satisfy>
            <csp:Function name="Equals">
                <csp:Parameter>
                    <csp:Function name="GetTargetDomain"/>
                </csp:Parameter>
                <csp:Parameter>"Finance"</csp:Parameter>
            </csp:Function>
        </csp:Satisfy>
    </csp:Rule>
</csp:Policy>
```

In order to make certain information accessible to the outside world in a well-controlled way, exceptions may be introduced into the firewall. For example the above policy may be changed as follows to establish such an exception:

```
Policy "FinanceFirewall"{
    Rule {
        When { getTargetDomain( ) == "Finance" }
        Satisfy {
            getOriginDomain( ) == "Finance"
            Or getOriginService( ) == "Finance Results Reporting"
        }
    }
}
```

This amended "FinanceFirewall" policy now checks if the invoking service is from the "Finance" domain or if it is one of the known exceptions. In the example, only one exception is defined, which is the "Finance Results Reporting" service. However, the introduction of exceptions needs to be handled very strictly. Preferably, a special approval service is used for this purpose, such as the one offered by the CentraSite SOA registry/repository of applicant. The approval service gets preferably invoked whenever there is a change to a policy enforcing the domain structure.

Another example is to restrict the set of services that can be called by the services of the "Finance" domain. This ensures that the business domain services are dependent only on reliable services. This restriction may easily be stated with a domain policy as shown in the following example:

```
Policy "FinanceDataProviders" {
    Rule {
        When { getOriginDomain( ) == "Finance" }
        Satisfy {
            getTargetDomain( ) == "Finance"
            Or getTargteDomain( ) == "Controlling"
            Or getTargetDomain ( ) == "Procurement"
        }
    }
}
```

As can be seen, the "FinanceDataProviders" policy just provides the three domains "Finance", "Controlling" and "Procurement" that are allowed to be called by services of the "Finance" domain.

The domain policies are registered in the SOA registry/repository and preferably referenced by one or more categories defining the domain in the business domain taxonomy. A domain can have design-time and runtime domain policies.

The design-time domain policies enforce the domain structure and the asset compliance during design-time in the SOA registry/repository.

The domain structure enforcing policies are preferably assigned to more than one domain. For example, the exemplary policies shown above may be associated to the source and the target domains mentioned in the respective policy, which are "Finance", "Controlling" and "Procurement". During design-time, the domain policies are checked whenever the assets of a domain are changed. The structure enforcing policies need to be checked as to whether there is a change in the interaction between SOA assets. Keeping track of the interactions is one of the central use cases of a SOA registry/repository. Therefore, any designed interactions are represented by relationships in the SOA registry/repository. This means that if a service (or other SOA asset) is supposed to consume the result of another service (or other SOA asset), a consumer relationship is published to the SOA registry/repository. To enforce the domain structure, the domain structure enforcing policies are checked whenever there is a change of the consumer relations. The policies to be checked can be determined based on the changing relationships and the domains that are affected by this change. If any of the policies is failing, the change is rejected.

Apart from the above-mentioned design-time aspects, a domain may also have runtime policies addressing the runtime interactions between SOA assets. Beside the aspects covered by design-time policies, runtime policies cover dedicated runtime aspects, such as logging, metrics and/or event reporting. Typically, runtime policies are not enforced by SOA registry/repositories, since SOA registry/repositories are focused on the design time aspects and do not provide the capability of enforcing runtime policies. Nevertheless runtime policies can be managed by the SOA registry/repository. For achieving the enforcement, the runtime policies need to be deployed to dedicated runtime enforcement points or runtime containers with policy enforcement capabilities. In the current state of the art for SOA, design-time policies are handed down to the runtime container together with the SOA asset itself, i.e. the SOA asset carries its own policies, which are asserted as the SOA asset runs. In the case of a rogue asset, design-time policies designed for other target containers are transmitted along with the asset. The domain approach would avoid executing these rogue assets in the wrong domain. For example, a financial SOA asset would be designed to run in the trusted financial container, not in an external cloud container. Still, this asset runs in the cloud container because the policy might be compatible with the runtime container, but this does not mean that it is desired to run this way (because of security, data protection issue, performance, etc.). The domain approach would stop the asset from running in the wrong container (according to the scheme: container not in the design-time domain=not executed+alarm).

Automatic Deployment of Domain Policies

In real-life scenarios, the information registered in a SOA registry/repository is typically neither correct nor comprehensive. Accordingly, there might be services bypassing or violating the defined design-time policies. For example, there might be rogue services that are calling services from "Finance" domain (cf. FIG. 4). If these rogue services are not belonging to the "Finance" domain, they are violating the exemplary domain policies specified for the "Finance" business domain. Moreover, there might be services invoking services running on one of the runtime containers of the "Finance" domain, but the invocation does not have the appropriate authentication information.

To make sure that the domain design-time policies are not by-passed by any unregistered services, the present invention proposes in one embodiment a method as schematically shown in FIG. 2. As can be seen, one or more design-time domains are defined in step 1000 and corresponding design-time policies 110 are defined in step 2000. Steps 1000 and 2000 may be performed iteratively in order to refine the design-time domain and policy definitions.

After the design-time domains and the corresponding design-time policies 110 have been defined, the design-time domain policies 110 are translated into runtime policies in step 3000.

The first step of the translation of a design-time domain policy is to copy the design-time policy 110, since the runtime policy is not meant as a replacement. Rather, the design-time policy is still needed for performing the above-explained design-time governance. For domain structure enforcing policies, the next step is to resolve all domain references in the policy into the URIs of the runtime containers of the referenced domains. This is necessary since runtime containers or runtime policy enforcement points are not aware of any domain definitions. Finally, a relationship between the design-time policy and the result of the translation is created. This allows checking for a design-time policy the status of the runtime policies.

In the exemplary embodiment, the translated design-time policies 110 are combined with the runtime-policies. The combination can be done using the WS-Policy specification which allows building complex policies by combining simple policy assertions. For example assuming that the "Finance" domain has a runtime policy that verifies that all messages are signed, together with the "FinanceFirewall" domain policy the result of the combination via WS-Policy looks as follows.

```
<wsp:Policy>
    <wsp:ExactlyOne>
        <wsp:All>
            <sp:SignedParts>
                <sp:Body/>
            </sp:SignedParts>
            <csp:Policy name="FinanceFirewall">
                <csp:Rule>
                ...
                </csp:Rule>
            </csp:Policy>
        </wsp:All>
    </wsp:ExactlyOne>
</wsp:Policy>
```

Here, the "FinanceFirewall" policy becomes a policy assertion and it is combined with the assertion that checks the proper signing.

When a runtime policy is defined for a business domain in the SOA registry/repository 10, it is typically not known on which runtime container 20 it will be deployed to later on (in order to separate the logical/functional design from the specific physical implementation). Therefore, the design-time policies 110 are preferably defined in the SOA registry/repository 10 independently of a concrete runtime container 20.

To deploy domain runtime policies 110, suitable runtime containers 20 thus need to be defined for a given domain. In the exemplary embodiment, a runtime domain already has a set of runtime containers 20 (note that the runtime domains can be defined similar to the design-time domains in the SOA registry/repository 10). For (business) design-time domains, the runtime container assignment is preferably done by mapping a design-time domain to one or more runtime domains. Also, multiple design-time domains can be mapped to the same runtime domain.

Several runtime policy enforcement products support standards such as WS-Policy and WS-Security for specifying runtime policies. Therefore, the runtime policies managed in WS-Policy format do not need to be translated for such kinds of runtime containers. However, embodiments of the present invention are not restricted to these standard supporting runtime enforcement points. If the runtime container or runtime enforcement point is not standards-based, the runtime policies need to be translated into the supported format before they can be deployed.

FIG. 3 shows a preferred process for translating (step 3000; FIG. 2) and deploying (step 4000) runtime domain policies in accordance with one embodiment of the present invention. As can be seen in FIG. 3, the step 3100 serves to find out if the runtime containers 20 of the domain provide the required capabilities for enforcing the runtime domain policy/policies. For runtime domain policies addressing the domain interaction, the translation typically does not require any specific policy enforcement capabilities, but only the capability to find out the source and the target of a service invocation. For translating other policies, more specific policy enforcement capabilities are required. Since not every runtime container 20 offers the same set of capabilities, their capabilities must be registered in the SOA registry/repository 10. The capabilities are preferably given in terms of policy assertion types, as defined in standards such as WS-Policy and WS-Security. Examples are policy assertions that can verify whether messages are signed or encoded properly. Complex capabilities may be defined by combining policy assertions. Every capability or policy assertion type has a unique qualified name. The supported policy assertion types are maintained in the capability taxonomy in the SOA registry/repository. The metadata registered for a runtime container in the SOA registry/repository may then reference those capabilities it supports by referencing the categories of the capability taxonomy. The capability taxonomy may be extended whenever a new type of runtime container 20 is registered. Having a unique representation allows to match the policy assertions referenced by a runtime policy with the policy assertions provided by the runtime container.

If a runtime policy cannot be deployed to a runtime container because of missing capabilities, the SOA registry/repository 10 preferably sends out an according notification. This ensures that gaps in the automated deployment process are properly communicated. For deploying a runtime domain policy successfully to a runtime domain, the deployment must preferably be successful for all containers 20 of that domain.

Exemplary Implementation

As explained above, the implementation of preferred embodiments of the present invention is based on a SOA registry/repository 10 and on one or more runtime containers 20. FIG. 1 gives an overview of how the registry/repository 10 and the runtime containers 20 (cf. the exemplary containers 20a and 20b) are interacting.

Exemplary SOA Registry/Repository

There are several SOA registry/repository products available which provide the necessary capabilities for implementing aspects of the present invention. An example is the CentraSite registry/repository of Software AG. The registry/repository 10 manages the registered SOA assets in an asset catalogue 100. The asset catalogue 100 supports a flexible metadata model for the metadata of services, runtime containers 20 and runtime policies. Examples for flexible metadata models are UDDI or JAXR. The metadata stored in the asset catalogue may comprise data such as a name and description of an asset. For Web Services, also the WSDL as well the accessUris can be stored. SOA Assets may be connected via associations to represent certain relationships between them. An example is the consumer relationship between services. The CentraSite registry/repository makes use of these relationships to offer dependency analysis capabilities.

In order to capture the meaning of SOA assets, the asset catalogue needs to support classifications. The CentraSite asset catalogue supports the definition of taxonomies and categories and using them for classifying SOA assets.

The registry/repository 10 further supports the definition and enforcement of design-time policies 110 via a design-time policy enforcement point for ensuring design-time constraints of the SOA registry/repository. The design-time polices are triggered whenever there is a change to the metadata stored in the asset catalogue. The metadata of the design-time policies are also registered in the SOA registry policies.

The CentraSite registry/repository supports a collection of predefined policies or policy actions. Design-time policies may be defined by combining predefined policy assertions. In addition, general purpose custom policies can be defined e.g. by providing a script or an executable function. The policies may reject changes, but they may also trigger other actions such as notifying a user about changes via email or other messaging capabilities of the SOA registry/repository. A more advanced action is the initiation of an approval workflow. Here, the SOA registry/repository creates approval requests that can be accepted or rejected by the user. The metadata changes are rejected or accepted accordingly.

Furthermore the SOA registry/repository needs to offer advanced search capabilities for looking up metadata for SOA assets to enable their reusage.

Exemplary Runtime Policy Enforcement Point

For implementing embodiments of the present invention, runtime policy enforcement points (PEP) or runtime containers with policy enforcement capabilities may be needed. Sample products include Layer 7's SOA Gateway and Software AG's webmethods Mediator. Runtime PEPs are verifying runtime policies on the requests and responses of a service invocation in a SOA. Runtime policies are supposed to verify security constraints and other runtime aspects like logging, metrics and event reporting. For specifying runtime policies declaratively, they support standards like WS-Policy and WS-Security. A runtime PEP typically supports a set of predefined policy assertions. Products like Layer 7's SOA Gateway and Software AG's webmethods Mediator support a close integration with SOA registry/repository like CentraSite. Out of the box the CentraSite SOA registry/repository allows to manage Mediator runtime policies and there deployment to Mediator instances.

Combining SOA Registry/Repository and Runtime Enforcement Point

For implementing embodiments of the present invention, the taxonomies and categories in the SOA registry/repository may be used for representing business (design-time) and runtime domains. One way for representing business and runtime domains is to define a taxonomy for business domains and a taxonomy for runtime domains. Each domain is represented by a category in the taxonomies. The mapping between business domains and runtime domains may then be represented by relationships between the categories of the domain taxonomies 120. SOA assets can be assigned to a category representing a domain by adding a classification to the asset pointing to the domain category.

For defining the scope of a domain policy, it is added to a domain category. The policy enforcement needs to be extended to take notice of this assignment to enable the design-time enforcement of the domain structure.

General purpose design-time policies can be used to do the deduction of the runtime domain policies and to translate and deploy them to runtime containers. The deployment policies running in the registry/repository 10 are able to interact with the registered runtime containers 20. This includes that every type of runtime container 20 has its own deployment policy that knows the supported policy format. For communicating any failing deployments the notification mechanism 130 can be used to communicate any failing policy translation or failing policy deployment. The notifications 130 are triggered by the translation and deployment policies.

Taxonomies are preferably used for representing the runtime policy enforcement capabilities. One approach is to define a taxonomy where each category represents a policy assertion type. These policy assertion types can be taken from the WS-standards. The taxonomy can also contain propriety policy assertion types. The metadata of a runtime is classified with the policy assertion categories the runtime container is supporting.

During deployment, the deployment policies extract the policy assertion types from a runtime policy and match them against the capability taxonomy. A support of proprietary policy assertions allows to support a wide variety of runtime PEPs. Even using hardware-based policy enforcement products such as Layer 7 or IBM Datapower is conceivable in this approach. It just needs to be ensured that the policy enforcement cannot be bypassed.

It will be appreciated that as used herein, the terms system, subsystem, service, module, program logic, programmed logic circuitry, and the like may be implemented as any suitable combination of software, hardware, firmware, and/or the like. It also will be appreciated that the storage locations/repositories herein may be any suitable combination of disk drive devices, memory locations, solid state drives, CD-ROMs, DVDs, tape backups, storage area network (SAN) systems, and/or any other appropriate non-transitory tangible computer readable storage medium. It also will be appreciated that the techniques described herein may be accomplished by having at least one processor execute instructions that may be tangibly stored on a non-transitory computer readable storage medium. Similar statements apply with respect to the clients, servers, and/or other elements in various network arrangements.

What is claimed is:

1. A computer-implemented method for enabling the enforcement of design-time policies during runtime in a service-oriented architecture (SOA), wherein the SOA comprises a plurality of SOA assets and at least one runtime container, the runtime container being configured to enforce runtime policies on SOA assets executed therein, the method comprising:

a. obtaining at least one design-time policy from a SOA registry of the SOA, wherein the at least one design-time policy applies to a plurality of SOA assets grouped into a design-time domain;

b. automatically deriving at least one runtime policy from the at least one design-time policy and at least one runtime domain from the design-time domain, the at least one runtime domain indicating at least one runtime container;

c. performing a compatibility check to determine whether the at least one runtime policy can be enforced by the at least one runtime container; and d. depending on the result of the compatibility check, automatically deploying the at least one runtime policy to the runtime container.

2. The method of claim 1, wherein the at least one design-time policy defines at least one restriction to be met by the SOA assets within the respective design-time domain.

3. The method of claim 1, wherein the at least one design-time policy defines at least one restriction to be met by an interaction between two SOA assets from different design-time domains.

4. The method of claim 1, wherein the design-time policies and/or the runtime policies comprise one or more WS-Policy assertions.

5. The method of claim 1, wherein the performing of the compatibility check comprises:
   obtaining at least one capability definition of the runtime container from the SOA registry; and
   comparing the at least one capability definition of the runtime container with a required capability of the runtime-policy.

6. The method of claim 1,
   wherein the at least one design-time policy is defined in the SOA registry independent of a specific runtime container; and
   wherein the compatibility check is performed based on a mapping obtained from the SOA registry, wherein the mapping maps the design-time domain onto at least one runtime domain, the runtime domain comprising the runtime container.

7. The method of claim 1, further comprising issuing a notification if the at least one runtime policy cannot be enforced by the runtime container.

8. The method of claim 1, wherein the design-time domain and/or the runtime domain is defined in at least one taxonomy of the SOA registry.

9. A non-transitory computer readable storage medium tangibly storing instructions that, when executed by a computer system including at least one processor and a memory, implements a method in accordance with claim 1.

10. A SOA registry for enabling the enforcement of design-time policies during runtime in a service-oriented architecture (SOA),
   wherein the SOA comprises a plurality of SOA assets, and at least one runtime container, the runtime container being configured to enforce runtime policies on SOA assets executed therein,
   wherein the SOA registry comprises:
   a. a policy storage, configured to store at least one design-time policy, wherein the at least one design-time policy applies to a plurality of SOA assets grouped into a design-time domain;
   b. at least one processor configured to:
      automatically derive at least one runtime policy from the at least one design-time policy and at least one runtime domain from the design-time domain, the at least one runtime domain indicating at least one runtime container;
      perform a compatibility check to determine whether the at least one runtime policy can be enforced by the at least one runtime container; and
      depending on the result of the compatibility check, automatically deploy the at least one runtime policy to the runtime container.

11. The SOA registry of claim 10, wherein the at least one processor is further configured, in connection with the performing of the compatibility check, to:
   obtain at least one capability definition of the runtime container from the SOA registry; and
   compare the at least one capability definition of the runtime container with a required capability of the runtime-policy.

12. The SOA registry of claim 10,
   wherein the at least one design-time policy is defined in the SOA registry independent of a specific runtime container; and
   wherein the at least one processor is further configured, in connection with the performing of the compatibility check, to operate based on a mapping obtained from the SOA registry, wherein the mapping maps the design-time domain onto at least one runtime domain, the runtime domain comprising the runtime container.

13. The SOA registry of claim 10, further comprising at least one taxonomy configured to define the design-time domain and/or the runtime domain.

14. The SOA registry of claim 10, wherein the at least one processor is further configured to issue a notification if the at least one runtime policy cannot be enforced by the runtime container.

15. A service-oriented architecture (SOA) system, comprising at least one processor, a memory, a SOA registry in accordance with claim 10, and at least one runtime container.

16. The method of claim 1, wherein at least some of the SOA assets are web services.

17. The SOA registry of claim 10, wherein at least some of the SOA assets are web services.

18. The method of claim 1, wherein at least one design-time policy includes sending a notification of changes in the SOA registry.

19. The SOA registry of claim 10, wherein at least one design-time policy includes sending a notification of changes in the SOA registry.

20. The method of claim 1, wherein automatically deriving at least one runtime policy from the at least one design-time policy includes copying the at least one design-time policy, translating the at least one copied design-time policy into the at least one runtime policy by resolving all domain references in the design-time policy into URIs of the at least one runtime container of the at least one derived runtime domain, and creating a relationship between the at least one design-time policy and the corresponding translated at least one runtime policy.

21. The method of claim 1, further comprises combining, based on WS-Policy specifications, the at least one design-time policy with the at least one derived runtime policy.

* * * * *